F. R. BANKS.
VALVE HANDWHEEL.
APPLICATION FILED FEB. 17, 1921.

1,426,272.

Patented Aug. 15, 1922.

WITNESSES
Edw. Thorpe
Geo. G. Hooker

INVENTOR
FREDERICK ROCKWOOD BANKS

BY Munn & Co.

ATTORNEYS

UNITED STATES PATENT OFFICE.

FREDERICK ROCKWOOD BANKS, OF PATERSON, NEW JERSEY, ASSIGNOR TO McNAB & HARLIN MANUFACTURING COMPANY, OF NEW YORK, N. Y., A CORPORATION OF NEW YORK.

VALVE HANDWHEEL.

1,426,272.  Specification of Letters Patent.  Patented Aug. 15, 1922.

Application filed February 17, 1921. Serial No. 445,711.

*To all whom it may concern:*

Be it known that I, FREDERICK ROCKWOOD BANKS, a citizen of the United States, and a resident of Paterson, in the county of Passaic and State of New Jersey, have invented a new and Improved Valve Handwheel, of which the following is a full, clear, and exact description.

The invention relates to valves, notably gate valves operating under high pressure.

The object of the invention is to provide a new and improved valve handwheel arranged to enable an operator to turn the handwheel with a view to seat or unseat the valve and without requiring the exertion of much physical force.

Another object is to provide a valve handwheel of about the same size and general shape of the valve handwheels now generally used, thus avoiding the establishment of very large, unsightly and heavy handwheels in order to obtain the desired leverage.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both views.

Figure 1:
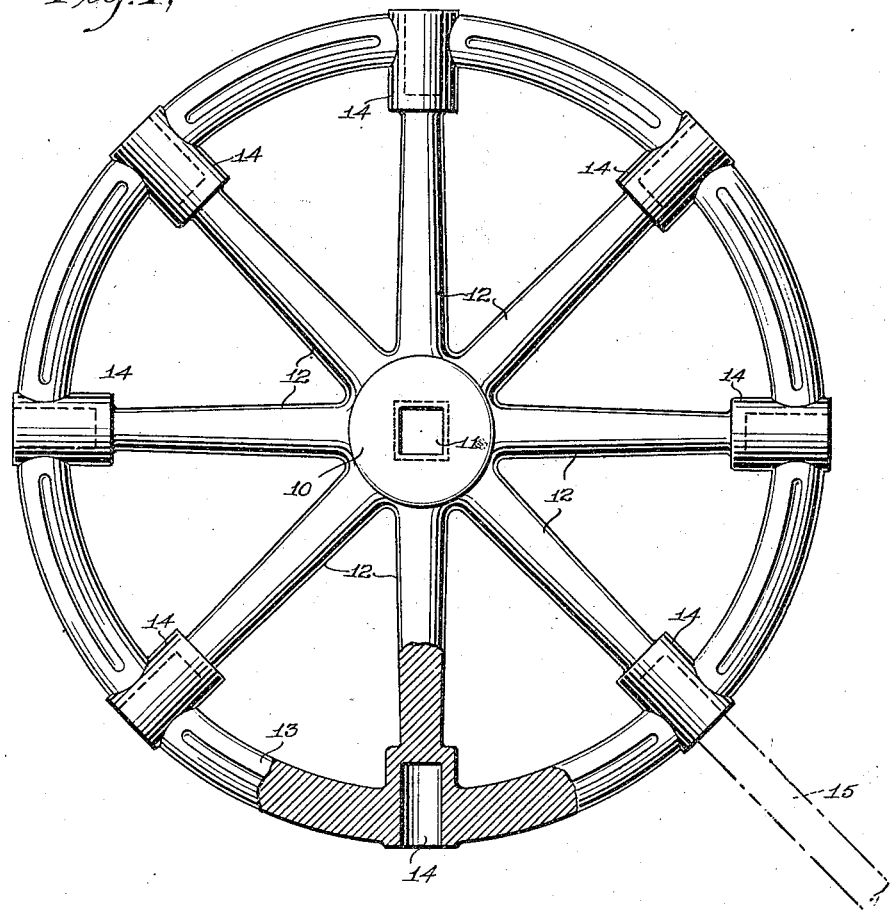
Figure 2:
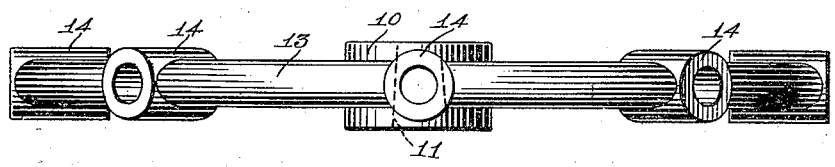

Figure 1 is a plan view of the improved valve handwheel with a portion shown in section; and Figure 2 is a side elevation of the same.

In manipulating a gate valve, notably one that is under high pressure it is frequently necessary for an operator to use considerable physical force in turning the valve handwheel for seating or unseating the valve owing to the high pressure exerted against the gate of the valve. In order to enable the operator to readily turn the handwheel without increasing the diameter of the wheel the following arrangement is made: The hub 10 of the valve handwheel is provided with a square and preferably tapering opening 11, although any form of opening may be used for attaching the valve handwheel to the stem or stem sleeve of the valve, and from the hub 10 radiate integral spokes 12 integrally connected at their outer ends with a rim 13. As shown in the drawings, sockets 14 are disposed radially and formed partly and integrally on the rim 13 and partly and integrally on the outer end of the spokes 12. The sockets 14 are open at their outer ends at the peripheral face of the rim 13 to permit the insertion of a rod or other leverage extension member 15 to allow the operator to readily turn the valve hand wheel with an increased leverage thereby requiring the exertion of considerably less physical force on the part of the operator for turning the handwheel and for seating and unseating the valve. Each socket 14 is sufficiently large to permit the insertion of a good sized extension member and the socket is of sufficient length for the extension member 15 to have a secure hold in the socket when inserted therein. The socket 14, furthermore, tends to reinforce the connection between the spokes 12 and the rim 13 and without requiring increasing of the cross sectional areas of the spokes 12 and the rim 13.

Although I have shown a socket 14 in connection with each spoke 12 of the handwheel this arrangement is not absolutely necessary as less sockets can be used if desired.

Having thus described my invention, I claim as new and desire to secure by Letters Patent:—

1. A handwheel for high pressure valves having a rim and radiating spokes, said rim being provided with radial sockets open at the peripheral face of the rim for the insertion of a leverage extension member with which to turn the wheel said sockets extending into the respective spokes.

2. A handwheel for high pressure valves comprising a hub having attaching means for attaching it to the valve member to be turned, spokes radiating from the said hub, a rim integral with the outer ends of the said spokes, and radially disposed sockets formed integrally and partly on the said rim and partly and integrally on the outer ends of the said spokes, the said sockets being open at their outer ends at the peripheral face of the said rim.

FRED'K ROCKWOOD BANKS.